(12) United States Patent
Eickhoff et al.

(10) Patent No.: US 8,283,079 B2
(45) Date of Patent: Oct. 9, 2012

(54) FUEL CELL POWER GENERATOR WITH WATER RESERVOIR

(75) Inventors: Steven J. Eickhoff, Plymouth, MN (US); Chunbo Zhang, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1732 days.

(21) Appl. No.: 11/592,692

(22) Filed: Nov. 3, 2006

(65) Prior Publication Data

US 2008/0107930 A1    May 8, 2008

(51) Int. Cl.
*H01M 8/04* (2006.01)
(52) U.S. Cl. .................. 429/410; 429/446
(58) Field of Classification Search .......... 429/12, 429/13, 34, 36, 38, 410, 446, 450, 515, 516
See application file for complete search history.

(56) References Cited

U.S. PATENT DOCUMENTS

| | | | |
|---|---|---|---|
| 3,765,946 A | 10/1973 | Werner et al. | |
| 3,994,697 A | 11/1976 | Burke | |
| 4,138,089 A | 2/1979 | McCarthy | |
| 4,155,712 A | 5/1979 | Taschek | |
| 4,261,955 A | 4/1981 | Bailey, Jr. et al. | |
| 4,614,204 A | 9/1986 | Dolejs | |
| 4,629,664 A * | 12/1986 | Tsukui et al. | 429/449 |
| 5,346,777 A | 9/1994 | Namba et al. | |
| 5,372,617 A | 12/1994 | Kerrebrock et al. | |
| 5,458,989 A | 10/1995 | Dodge | |
| 5,853,910 A | 12/1998 | Tomioka et al. | |
| 5,914,200 A | 6/1999 | Schabert et al. | |
| 6,093,501 A | 7/2000 | Werth | |
| 6,265,093 B1 | 7/2001 | Surampudi et al. | |
| 6,303,244 B1 | 10/2001 | Surampudi et al. | |
| 6,395,414 B1 | 5/2002 | Clingerman et al. | |
| 6,413,665 B1 | 7/2002 | Blanchet et al. | |
| 6,432,566 B1 | 8/2002 | Condit et al. | |
| 6,582,842 B1 | 6/2003 | King | |
| 6,844,100 B2 | 1/2005 | Bourgeois et al. | |
| 6,979,508 B2 | 12/2005 | Gurin et al. | |
| 7,527,885 B2 * | 5/2009 | Toukura | 429/430 |
| 2003/0235728 A1 * | 12/2003 | Van Zee et al. | 429/22 |
| 2004/0052723 A1 | 3/2004 | Jorgensen | |
| 2004/0202903 A1 | 10/2004 | deVos | |
| 2005/0022883 A1 | 2/2005 | Adams et al. | |
| 2005/0079128 A1 | 4/2005 | DeVos et al. | |
| 2005/0118469 A1 | 6/2005 | Leach et al. | |

(Continued)

FOREIGN PATENT DOCUMENTS

EP    1469545 A2    10/2004

(Continued)

OTHER PUBLICATIONS

"U.S. Appl. No. 11/606,758 Final Office Action mailed Sep. 15, 2010", 9 pgs.

(Continued)

*Primary Examiner* — Jennifer Michener
*Assistant Examiner* — Monique Wills
(74) *Attorney, Agent, or Firm* — Schwegman, Lundberg & Woessner, P.A.

(57) ABSTRACT

A power generator includes a fuel container adapted to hold a hydrogen containing fuel. A two stage valve is coupled between a fuel cell and a fuel container and between a water reservoir and the fuel container. A pressure responsive actuator is coupled to the two stage valve and the fuel container.

20 Claims, 3 Drawing Sheets

U.S. PATENT DOCUMENTS

| | | | |
|---|---|---|---|
| 2005/0158595 | A1 | 7/2005 | Marsh et al. |
| 2005/0181245 | A1 | 8/2005 | Bonne et al. |
| 2006/0108000 | A1* | 5/2006 | Kaneko et al. ............... 137/202 |
| 2006/0127722 | A1 | 6/2006 | Nakajima et al. |
| 2006/0134485 | A1* | 6/2006 | Horiuchi et al. ............... 429/26 |
| 2006/0234093 | A1 | 10/2006 | Schaefer et al. |
| 2007/0184312 | A1 | 8/2007 | Eickhoff |
| 2008/0220300 | A1* | 9/2008 | Jones et al. ..................... 429/23 |
| 2009/0236551 | A1* | 9/2009 | Nomichi et al. ......... 251/129.15 |

FOREIGN PATENT DOCUMENTS

| | | |
|---|---|---|
| WO | WO-2004075375 A2 | 9/2004 |
| WO | WO-2005/004273 A2 | 1/2005 |

OTHER PUBLICATIONS

"U.S. Appl. No. 11/606,758, Response filed Jun. 21, 2010 to Non Final Office Action mailed Mar. 25, 2010", 12 pgs.

"U.S. Appl. No. 11/606,758, Examiner Interview Summary Request mailed Mar. 25, 2010", 1 pg.

"U.S. Appl. No. 11/606,758, Response filed Nov. 10, 2010 to Final Office Action mailed Sep. 15, 2010", 13 pgs.

"European Application Serial No. 07854813.8, Office Action mailed Feb. 9, 2011", 5 pgs.

Pasaogullari, Ugur, "Liquid Water Transport in Polymer Electrolyte Fuel Cells with Multi-Layer Diffusion Media", *Proceedings of IMECE04, 2004 ASME International Mechanical Engineering Congress and Exposition*, Anaheim, California,(Nov. 13-20, 2004),1-9.

U.S. Appl. No. 11/606,758, Response to Restriction Requirement filed Feb. 7, 2008 to Restriction Requirement mailed Jan. 7, 2008., 6.

"PCT Application No. PCT/US2007/085766, International Search Report mailed Apr. 2, 2008", 4 pgs.

"PCT Application No. PCT/US2007/085766, Written Opinion mailed Apr. 2, 2008", 6 pgs.

"U.S. Appl. No. 11/606,758, Non-Final Office Action Mailed May 12, 2008", 3.

"U.S. Appl. No. 11/606,758 , Response filed Aug. 17, 2011 to Final Office Action mailed Jun. 24, 2011", 14 pgs.

"U.S. Appl. No. 11/606,758, Final Office Action mailed Jun. 24, 2011", 10 pgs.

"European Application Serial No. 07854813.8, Response filed Jun. 9, 2011 to Office Action mailed Feb. 9, 2011", 7 pgs.

"U.S. Appl. No. 11/351,175 Response filed Jan. 13, 2010 to Restriction mailed :", 6 pgs.

"U.S. Appl. No. 11/351,175, Non-Final Office Action mailed Jul. 23, 2009", 10 pgs.

"U.S. Appl. No. 11/351,175, Response filed Oct. 21, 2009 to Non Final Office Action mailed Jul. 23, 2009", 11 pgs.

"U.S. Appl. No. 11/351,175, Restriction Requirement mailed Jan. 6, 2010", 07.

"U.S. Appl. No. 11/351,175, Restriction Requirement mailed Jan. 6, 2010", 7 pgs.

"U.S. Appl. No. 11/606,758 Non-Final Office Action mailed Nov. 13, 2009", 11 pgs.

"U.S. Appl. No. 11/606,758, Final Office Action mailed Jun. 10, 2009", 10 pgs.

"U.S. Appl. No. 11/606,758, Non-Final Office Action mailed Mar. 25, 2010", 12.

"Application U.S. Appl. No. 11/606,758, Non-Final Office Action mailed Nov. 24, 2008", 11 pgs.

"U.S. Appl. No. 11/606,758, Response filed Feb. 24, 2009 to Non Final Office Action mailed Nov. 24, 2008", 9 pgs.

"U.S. Appl. No. 11/606,758, Response filed Jan. 4, 2010 to Non Final Office Action mailed Nov. 13, 2009", 12 pgs.

"U.S. Appl. No. 11/606,758, Response filed Sep. 9, 2009 to Final Office Action mailed Jun. 10, 2009", 12 pgs.

"U.S. Appl. No. 11/606,758 Response filed Aug. 12, 2008 to Non-Final Office Action mailed May 12, 2008", 11 pgs.

"U.S. Appl. No. 11/606,759, Restriction Requirement mailed Jan. 7, 2008", 6 pgs.

"European Application Serial No. 06786891.9, Office Action mailed Feb. 25, 2010", 2 pgs.

\* cited by examiner

FUEL CELL POWER GENERATOR WITH WATER RESERVOIR

BACKGROUND

In some fuel cell based power generators, hydrogen is extracted from a fuel in the presence of water and then is introduced into a fuel cell to produce electricity. Power generators based on hydrogen generators and proton exchange membrane (PEM) fuel cells may be sensitive to ambient humidity and temperature, and may exhibit lower power density in certain conditions. There is need to reduce the sensitivity of fuel cell based power generators to ambient humidity.

Power generators based on hydrogen generators and proton exchange membrane (PEM) fuel cells may also have difficulty in providing increased power levels for sustained periods of time for selected portable devices. In other words, such portable devices may require high sustained power levels over short periods of time, and low power levels over other periods of time. Such power generators may have difficulty providing the sustained power levels.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
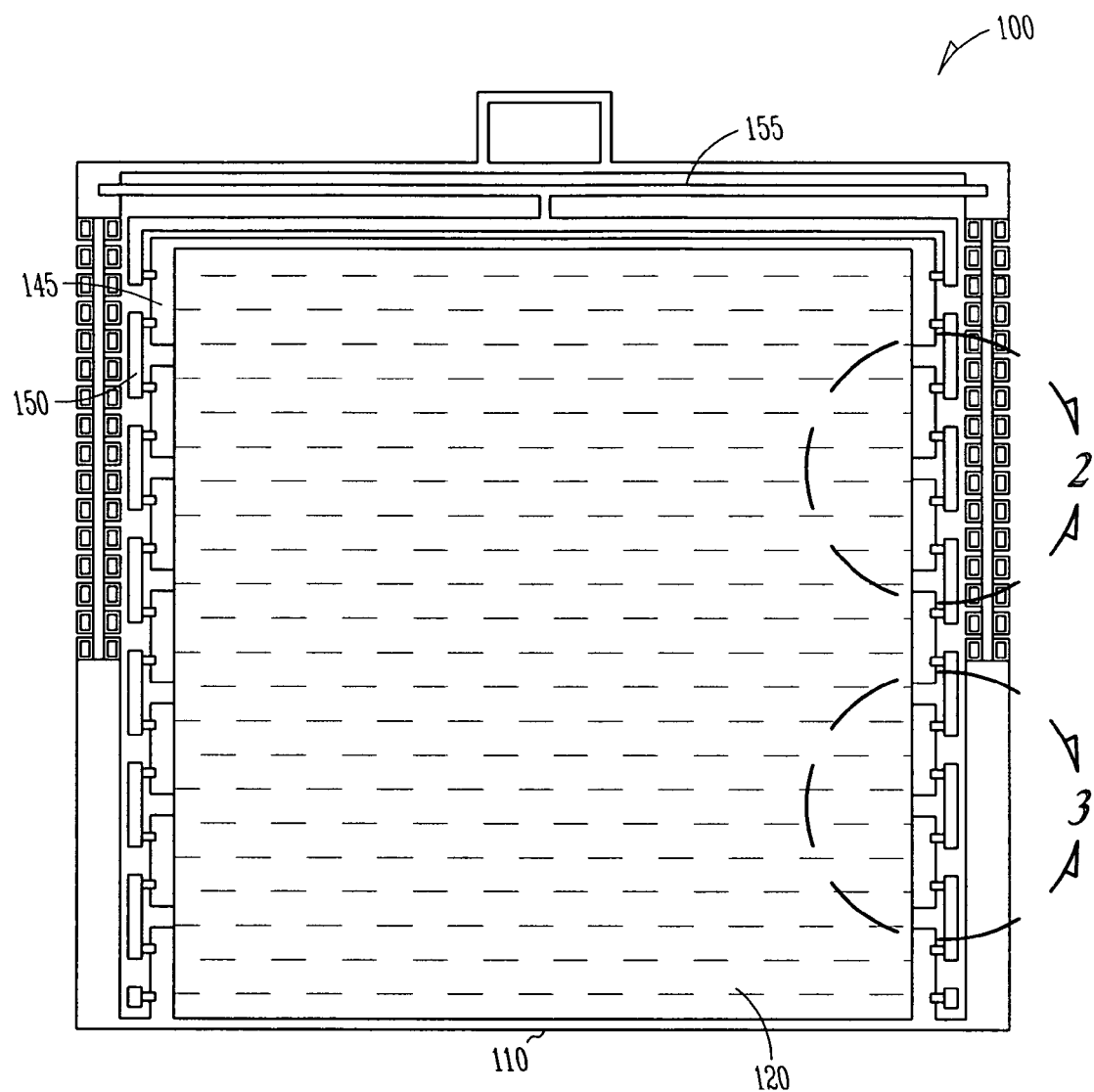
FIG. 1 is a cross section representation of a fuel cell based power generator according to an example embodiment.
Figure 2:
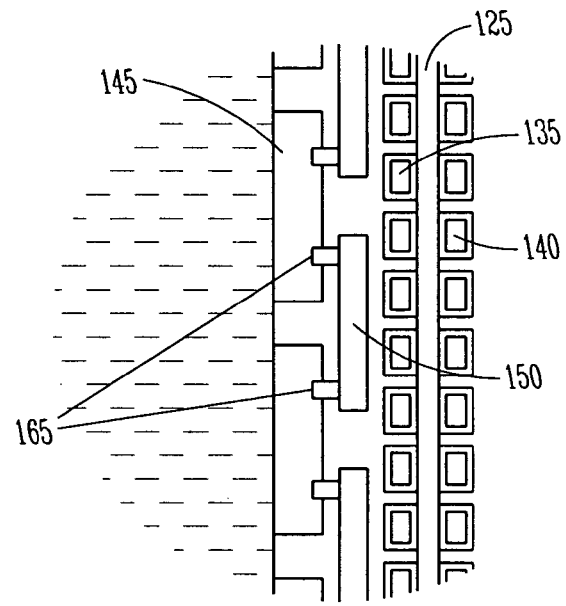
FIG. 2 is a cross section of a portion of the power generator of FIG. 1 illustrating a fuel cell stack according to an example embodiment.

FIG. 1 is a cross section representation of a fuel cell based power generator 100 according to an example embodiment. Generator 100 includes a cathode output electrode 110 and an anode output electrode 115. In one embodiment, the generator may be shaped similar to a commercially available dry cell battery, such that it can be substituted for the dry cell battery. Fuel chamber 120 may contain a hydrogen containing fuel that provides hydrogen to a fuel cell 125, which is shown in expanded form in FIG. 2, wherein the numbering is consistent with FIG. 1.

Fuel cell 125 may include a proton exchange membrane (PEM), catalyst layer, gas diffusion layer, micro porous layer. An anode electrode 135 is coupled to the fuel cell 125 between the fuel cell 125 and the fuel chamber 120. It is coupled to the anode output electrode 115. A cathode electrode 140 is coupled to the other side of the fuel cell stack, and is coupled to the cathode output electrode 110. It may also be exposed to ambient conditions.

Between the fuel cell 125 and the hydrogen chamber 120 is a two stage valve. The two stage valve includes a fixed plate 145 and a movable plate 150 that are coupled in a sliding relationship in one embodiment. A hydrogen and water vapor permeable particulate filter may also be used between the fuel cell and the fuel or fuel chamber 120. In one embodiment, the fixed plate 145 is supported in fixed position proximate or adjacent to the fuel chamber 120, and the movable plate 150 is coupled to a flexible diaphragm 155, that flexes in response to changes in pressure between the hydrogen pressure in the fuel chamber and ambient pressure. The diaphragm 155 acts as a pressure responsive actuator that controls the two stage valve. Each of the fixed plate 145 and movable plate have openings that prevent flow when in a closed position and allow flow when the openings at least partially line up.

In one embodiment the valve responds to a pressure differential between ambient and the inside of the power generator. The fuel cell membranes and water reservoir membranes are expose at different pressure differentials, with the fuel cell membranes exposed first, at a certain internal pressure. The water reservoir is exposed second, at a lower internal pressure. The internal pressure is a design parameter that can be set lower or higher than ambient.

In one embodiment, the fuel cell 125 extends along the generator for a length designed to provide desired electrical power characteristics. Such characteristics may be based on the needs of devices to be powered. In a further embodiment, the characteristics may be designed to provide similar current and voltage characteristics of existing batteries that are of the same shape or form factor, thus allowing the power generator 100 to replace such batteries.

Figure 3:
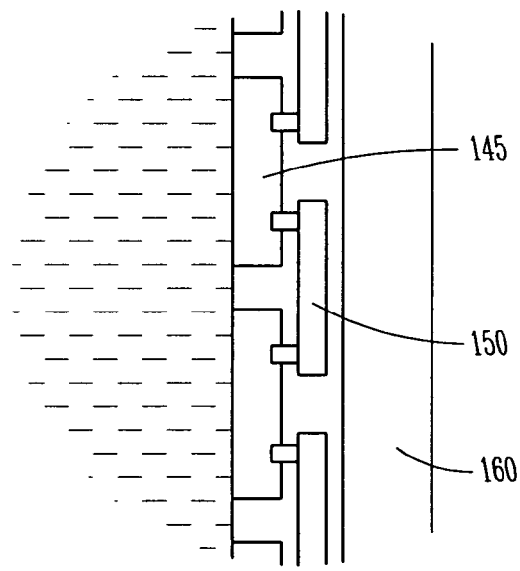
FIG. 3 is a cross section of a portion of the power generator of FIG. 1 illustrating a water absorbing membrane according to an example embodiment.

The remaining length of the power generator includes a water absorbing membrane 160 as shown in further detail in FIG. 3. The water absorbing membrane 160 may comprise a perfluorosulfonate ionomer membrane commercially available under the trademark Nafion® from EI DuPont de Nemours & Co. of Delaware. Nafion® may be used in one embodiment because it has a fluorinated backbone that makes it very stable, with sulfonic acid side chains that absorb water. The absorbing membrane 160 is proximate to the two stage valve and positioned between the valve and ambient. Absorbing membrane 160 absorbs water from ambient and allows it to diffuse to the fuel chamber 120 when a corresponding portion of the valve is open due to low pressure conditions in the fuel chamber.

In further embodiments, the water absorbing membrane may be constructed of any material or materials that are substantially impermeable to hydrogen and highly permeable to $H_2O$. It may be desirable for the membrane to have a high $H_2O$ unit volume, and fast desorption and adsorption characteristics to allow for quick ramping up of hydrogen production and hence electricity production at desired times. In one embodiment, the water absorbing membrane proportion of the generator 100 may be designed to obtain a desired maximum current.

In further embodiments, the fuel cell and water reservoir membrane do not need to be on separate portions of the power generator length; they can be intermittently spaced (in bands) along the length of the power generator, with corresponding valve sections. Many other alternative configurations of fuel cell and water reservoir membrane may be utilized with corresponding valves to selectively expose them to the fuel.

The two stage valve 145, 150 operates such that above a certain pressure (hydrogen pressure minus ambient pressure) only the fuel cell is exposed to hydrogen. Below a certain pressure, both the fuel cell 125 and the water absorbing membrane 160 are exposed to the fuel chamber, and hence the fuel.

Thus, the openings in the valve plates may be offset differently to allow for exposure of the fuel cell 125 to the fuel at normal current loads, and as the valves slide further in response to even lower pressures, allows for exposure of the water absorbing membrane 160 to the fuel. The openings may be any shape desired that maintains mechanical integrity of the plates and provides the desired functions of operating as a valve.

In one embodiment the power generator is cylindrical in shape, and the valve plates are concentric cylinders. Other shapes may also be used. The valve plates may form a low friction contact fit in one embodiment to enable relative movement or sliding. A lubricant may be used to reduce stiction between the plates. The lubricant may also operate as a sealant. In one embodiment, the lubricant may be graphite or silicon or other lubricant compatible with materials used. Oil or other hydrocarbon lubricants may also be used. In further embodiments, optional O-rings 165 may be used to provide sealing functions.

When the water absorbing membrane is exposed to fuel, water inside the membrane that has been absorbed from ambient will diffuse from the membrane to the fuel and react to generate hydrogen. The hydrogen is consumed by the fuel cell and generates water. In steady state, this excess water intake is balanced by water loss to ambient. The balance is established by the cathode hydration/humidity increase with the excess water. When cathode humidity is higher than ambient, water is lost (diffuses) to ambient. Thus, the extra water brought into the fuel cell through the water absorbing layer is balanced by water loss to the ambient. The improved hydration increases fuel cell efficiency and power density, and make the fuel cell less sensitive to ambient conditions.

In low humidity conditions, such as are common a low temperatures, prior fuel cells may perform poorly. The water absorbing layer operates as a water reservoir in such conditions, and can provide water to allow operation at sustained higher power conditions. The sustained higher power operation may vary from embodiment to embodiment, but typically can be on the range of minutes to several hours.

The pressure may also drop low during periods of sustained higher power demand. The water absorbing membrane may enable the fuel cell to provide higher power levels than would otherwise be available even in normal ambient conditions.

Figure 4:
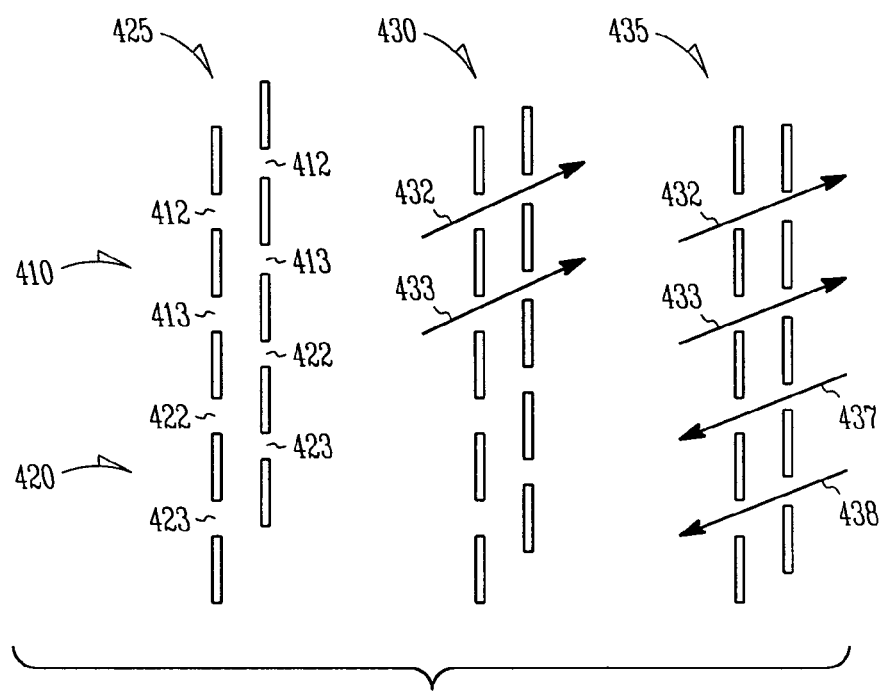
FIG. 4 is a diagram of a two stage valve.

In one embodiment, the two stage valve is shown in further detail in FIG. 4. The two stage valve comprises a first set 410 of selectively mating openings 412, 413 that remain at least partially mated to allow hydrogen from the fuel container to reach the fuel cell, and a second set 420 of selectively mating openings 422, 423 that mate when the pressure of hydrogen compared to ambient drops below a predetermined level. In FIG. 4, the plates of the valves are offset so that holes do not match up as shown at 425. This is a condition where no power is being drawn on the fuel cell. However as more power is drawn, FIG. 4 at 430 shows that the valves are offset sufficiently such that hydrogen can flow through the valve at 432, 433 to the fuel cell. However, the valve plates having the second set of openings at 420 do not have overlapping openings. As the pressure drops, the valve plates slide further as shown at 435, and allow hydrogen flow, and now water vapor flow as indicated at 437 and 438.

In one embodiment, the openings on the different sections of the valve plate may be the same size, but are offset from each other differently to allow for two stage operation as described above. In a further embodiment, the second set of mating openings may comprise smaller openings than the first set of mating openings. In a further embodiment, the second set of mating openings begin to mate to allow water vapor to flow to the fuel container at a lower pressure than that of the first set of mating openings.

The Abstract is provided to comply with 37 C.F.R. §1.72(b) to allow the reader to quickly ascertain the nature and gist of the technical disclosure. The Abstract is submitted with the understanding that it will not be used to interpret or limit scope or meaning of the claims.

The invention claimed is:

1. A power generator comprising:
   a fuel container adapted to hold a hydrogen containing fuel;
   a fuel cell;
   a water reservoir;
   a two stage valve coupled between the fuel cell and the fuel container and between the water reservoir and the fuel container; and
   a pressure responsive actuator coupled to the two stage valve and the fuel container, wherein the two stage valve comprises a first set of selectively mating openings that remain at least partially mated to allow hydrogen from the fuel container to reach the fuel cell, and wherein the two stage valve comprises a second set of selectively mating openings that mate in response to a differential between hydrogen pressure in the fuel container and ambient pressure.

2. The power generator of claim 1 wherein the water reservoir comprises a water absorbing membrane.

3. The power generator of claim 2 wherein the fuel container has a length, the fuel cell extends along a portion or portions of length of the fuel container between the valve and ambient conditions, and the water absorbing membrane extends along a separate portion or portions of the length of the fuel container between the valve and ambient conditions.

4. The power generator of claim 3 wherein a first stage of the two stage valve extends along the portion or portions of the length of the fuel container corresponding to the fuel cell, and a second stage of the two stage valve extends along the portion or portions of the length of the fuel container corresponding to the water absorbing membrane.

5. The power generator of claim 4 wherein the first stage of the two stage valve opens in response to a first differential pressure between hydrogen pressure in the fuel container and ambient pressure.

6. The power generator of claim 5 wherein the second stage of the two stage valve opens in response to a lower, second differential pressure.

7. The power generator of claim 2 wherein the water absorbing membrane absorbs water from ambient and provides it to fuel in the fuel container responsive to the two stage valve.

8. The power generator of claim 1 and further comprising a water vapor permeable particulate filter positioned to separate the fuel container from fuel.

9. The power generator of claim 1 wherein the water reservoir comprises a water absorbing low hydrogen permeable membrane.

10. A power generator comprising:
    a fuel container adapted to hold a hydrogen containing fuel;
    a fuel cell;
    an anode coupled to the fuel cell;
    a cathode coupled to the fuel cell;
    a water reservoir;
    a two stage valve coupled between the fuel cell and the fuel container and between the water reservoir and the fuel container; and a pressure responsive actuator coupled to the two stage valve and the fuel container, wherein the two stage valve comprises a first set of selectively mating openings that move responsive to the actuator to allow hydrogen from the fuel container to reach the fuel cell;

wherein the first set of selectively mating openings remain at least partially mated to allow hydrogen from the fuel container to reach the fuel cell, and wherein the two stage valve comprises a second set of selectively mating openings that mate in response to a differential between hydrogen pressure in the fuel container and ambient pressure.

11. The power generator of claim 10 wherein the fuel container is substantially cylindrical in shape and the fuel cell is substantially cylindrical in shape and coaxial with the fuel container and extends along a portion of a length of the fuel container between the valve and ambient conditions, and the water absorbing membrane is substantially cylindrical in shape and coaxial with the fuel container and extends along a separate portion of the length of the fuel container between the valve and ambient conditions.

12. The power generator of claim 11 wherein the two stage valve is substantially cylindrical in shape and coaxial with the fuel container, and a first stage of the two stage valve extends along the portion or portions of the length of the fuel container corresponding to the fuel cell, and a second stage of the two stage valve extends along the portion or portions of the length of the fuel container corresponding to the water absorbing membrane.

13. The power generator of claim 12 wherein the first stage of the two stage valve opens in response to a first differential between hydrogen pressure in the fuel container and ambient pressure.

14. The power generator of claim 13 wherein the second stage of the two stage valve opens in response to a lower, second differential pressure.

15. The power generator of claim 11 wherein the water absorbing membrane comprises a low hydrogen permeable membrane that absorbs water from ambient and provides it to fuel in the fuel container responsive to the two stage valve.

16. The power generator of claim 10 and further comprising a water vapor permeable particulate filter positioned to separate the fuel container from fuel.

17. The power generator of claim 10 wherein the second set of mating openings comprise smaller openings than the first set of mating openings, and wherein the second set of mating openings begin to mate to allow water vapor to flow to the fuel container at a lower differential pressure than that of the first set of mating openings.

18. The power generator of claim 1 wherein the two stage valve has a first stage to control a flow rate of hydrogen from the fuel container and a second stage to control a flow rate of water vapor from the water reservoir responsive to the same pressure.

19. The power generator of claim 10 wherein the two stage valve has a first stage to control a flow rate of hydrogen from the fuel container and a second stage to control a flow rate of water vapor from the water reservoir responsive to the same pressure.

20. A power generator comprising:
a fuel container adapted to hold a hydrogen containing fuel;
a fuel cell;
a water reservoir;
a two stage valve coupled between the fuel cell and the fuel container and between the water reservoir and the fuel container, wherein the two stage valve comprises parallel valve plates having a first set of selectively mating openings and a second set of selectively openings; and
a pressure responsive actuator coupled to the two stage valve and the fuel container, wherein the first set of selectively mating openings remain at least partially mated to allow hydrogen from the fuel container to reach the fuel cell.

* * * * *